(12) United States Patent
Garrett et al.

(10) Patent No.: US 9,721,033 B2
(45) Date of Patent: Aug. 1, 2017

(54) SOCIAL NETWORKING CONTENT MANAGEMENT

(75) Inventors: Brett D. Garrett, Pleasant Grove, UT (US); Jim A. Nicolet, Port Orchard, WA (US); Scott A. Isaacson, Woodland Hills, UT (US)

(73) Assignee: Micro Focus Software Inc., Provo, UT (US)

( * ) Notice: Subject to any disclaimer, the term of this patent is extended or adjusted under 35 U.S.C. 154(b) by 0 days.

(21) Appl. No.: 13/037,170

(22) Filed: Feb. 28, 2011

(65) Prior Publication Data

US 2012/0221520 A1 Aug. 30, 2012

(51) Int. Cl.
*G06Q 10/00* (2012.01)
*G06F 17/30* (2006.01)

(52) U.S. Cl.
CPC ................ *G06F 17/3089* (2013.01)

(58) Field of Classification Search
USPC ............................................. 705/50
See application file for complete search history.

(56) References Cited

U.S. PATENT DOCUMENTS

| 5,608,903 | A | 3/1997 | Prasad et al. |
| 5,619,690 | A | 4/1997 | Matsumani et al. |
| 5,778,389 | A | 7/1998 | Pruett et al. |
| 6,330,572 | B1 | 12/2001 | Sitka |
| 7,024,427 | B2 | 4/2006 | Bobbitt et al. |
| 2004/0015456 | A1 | 1/2004 | Holtz et al. |
| 2004/0088382 | A1 | 5/2004 | Therrien et al. |
| 2004/0125798 | A1* | 7/2004 | Hondo et al. .............. 370/389 |
| 2004/0199566 | A1 | 10/2004 | Carlson et al. |
| 2005/0165796 | A1 | 7/2005 | Moore |
| 2006/0195658 | A1 | 8/2006 | Kanbe et al. |
| 2008/0133445 | A1* | 6/2008 | Pennington ....... G06F 17/30864 |
| 2011/0167114 | A1* | 7/2011 | Blanchard, III ....... G06Q 10/10 709/204 |
| 2011/0265148 | A1* | 10/2011 | Tam et al. ...................... 726/4 |
| 2011/0295798 | A1* | 12/2011 | Shain ........................... 707/617 |
| 2012/0110474 | A1* | 5/2012 | Chen et al. .................. 715/753 |
| 2013/0110776 | A1* | 5/2013 | Nunez Diaz ...... G06F 17/30575 707/624 |

FOREIGN PATENT DOCUMENTS

| JP | 2002-149465 | 5/2002 |
| JP | 2004-080538 | 3/2004 |

OTHER PUBLICATIONS

Wright, Charles P., et al., "Versatility and Unix Semantics in Namespace Unification", ACM Transactions on Storage (TOS), Nov. 2005, 16 pages.

(Continued)

*Primary Examiner* — John Hayes
*Assistant Examiner* — John M Winter
(74) *Attorney, Agent, or Firm* — Schwegman Lundberg & Woessner, P.A.

(57) ABSTRACT

A machine-controlled method may include receiving a file in a designated shared folder on a local device, automatically providing access to the file to a social networking website or service, and directing the social networking website or service to make the file available to users that are allowed to access a particular user account at the social networking website.

11 Claims, 6 Drawing Sheets

(56) References Cited

OTHER PUBLICATIONS

Cisco Systems, Inc., "EMC and Cisco: Global File Virtualization Integrating Rainfinity with a Cisco Network Infrastructure", 2006, 7 pages.
"What is HSM?—a definition from Whatis.com", http://searchstorage.techtarget.com/sDefinition/0,,sid5_gci214001, last updated Jul. 30, 2001, 2 pages.
Van Meter, Rod, "Hierarchical Storage Management", http://alumnus.caltech.edu/-rdv/comp-arch-storage/FAQ-2.3html, 1996, 8 pages.
Snyder, Kami, "The evolution of hierarchical storage management", excerpted from Storage Manifesto by Fred Moore, Horison Information Strategies, 2002, 2 pages.
"What is HSM?—A Word Definition from the Webopedia Computer . . . ", http://www.webopedia.com/TERM/H/HSM.html, last modified Oct. 30, 2001, 3 pages.
"Overview, IBRIX Fusion", http://www.ibrix.com/products.php, 2006, 3 pages.
"Open AFS Navigation Bar", http://www.openafs.org/navbar.html, printed Feb. 22, 2007, 2 pages.
"Welcome to the home of OpenAFS", http://www.openafs.org/pages, last updated Feb. 14, 2007, 2 pages.
Acopia Networks, "Storage Tiering Virtualization", http://www.acopia.com, printed Feb. 22, 2007, 1 page.
NeoPath Networks, "The File Storage Management Leader", http://www.neopathnetworks.com/default.aspx, printed Feb. 22, 2007, 1 page.
"FAN Data Sheets and Solution Briefs", http://www.brocade.com/resources/fan_datasheets.jsp, printed Feb. 22, 2007, 1 page.
"Hierarchical storage management", http://en.wikipedia.org/wiki/Hierarchical_storage_management, last updated Jul. 18, 2007, 1 page.

\* cited by examiner

SOCIAL NETWORKING CONTENT MANAGEMENT

RELATED APPLICATION

This application is related to U.S. patent application Ser. No. 11/555,824, titled "SYSTEM AND METHOD FOR HIERARCHICAL STORAGE MANAGEMENT USING SHADOW VOLUMES" and filed Nov. 2, 2006, which is commonly assigned with the present application and is hereby incorporated by reference herein.

TECHNICAL FIELD

The disclosed technology pertains to social networking websites and services, and more particularly to tools and techniques for an end user to manage content in connection with social networking websites and services.

BACKGROUND

The use of social networking tools, software, and websites is increasingly popular and the number of users and services continue to go up on a daily basis. For example, the number of www.Facebook.com users worldwide has exceeded the entire population of the United States and the number of professionals that use sites such as www.LinkedIn.com or www.Plaxo.com is also on the upswing. Social networking users want to stay connected to previous, and possibly future, friends, family members, and colleagues that may be able to help them, and each other, find rewarding and meaningful jobs and careers.

Also, there are many collaboration sites that people may join in order to post or comment on ideas or discussions such as Google Groups or Yahoo Groups. Many of these sites require profile information, such as a photo, personal history, career backgrounds, educational experience, and contact information. Some services or websites require this information while others allow it to be optional. Some of these sites allow an end user to upload a number of different media files, such as photos, videos, or other images, for sharing or collaboration.

The explosion of social networking activities has generated a wide variety of problems and concerns. For example, end users frequently need to deal with multiple copies or sources of similar data such as profiles, images, history, and contact info. End users are often required to learn how to use a number of different and unique interfaces in order to do similar operations such as upload, download, share, and access control. The loss of control that end users may experience over their content can be irritating to the user and possibly even troubling. For example, once an end user's image is uploaded to a social networking server, a copy of the image is then stored on servers that are outside the control of the end user. This means that the user has little, if any, control over how long the image is to be retained, who is allowed to see the image, who is allowed to share the image, etc.

Users of social networking sites and services often experience a number of problems and concerns in addition to those listed above. For example, redundancy may be difficult, if impossible, to avoid for an end user. That is, end users may find that they are performing the same operation(s) such as uploading, downloading, and sharing over and over at each of his or her social networking site or service. End users may also find themselves victims of neglect. For example, end users may be missing updates at one or more social networking sites or services. End users may even find themselves victims of abandonment or expulsion due to long term neglect. This could ultimately result in unintentional, and possibly unrecoverable, loss of use for the end user.

SUMMARY

In certain embodiments, a user may manage and control his or her social networking content at multiple sites using a single local device such as a desktop, netbook, or smartphone such as the Apple iPhone. For example, a user may place an image or other file in a designated shared directory on the local device. The system may then automatically share the image or other file with one or more social networking websites or services where the user has an account without the user needing to log into each account at all, let alone take actions at the site such as "select," "open," and "close." Consequently, the user does not need to worry about learning how to use all of the interfaces for the various social networking websites and services. Implementations of the disclosed technology may rely on dynamic storage technology (DST) drivers to provide the user with a single directory view of multiple back-end storage devices.

In certain embodiments, a web service can be used to access up-to-date shared data that is controlled by the end user, not social networking websites and services. For example, consider a situation in which an end user deletes a local copy of an image. Any Facebook photo sharing application that previously had access to the image will no longer have access to that image and, consequently, not be able to allow other users to view the image. There is no need for the user to log into his or her Facebook account and delete the image from a shared album under the account.

The foregoing and other features, objects, and advantages of the invention will become more readily apparent from the following detailed description, which proceeds with reference to the accompanying drawings.

DETAILED DESCRIPTION

Figure 1:
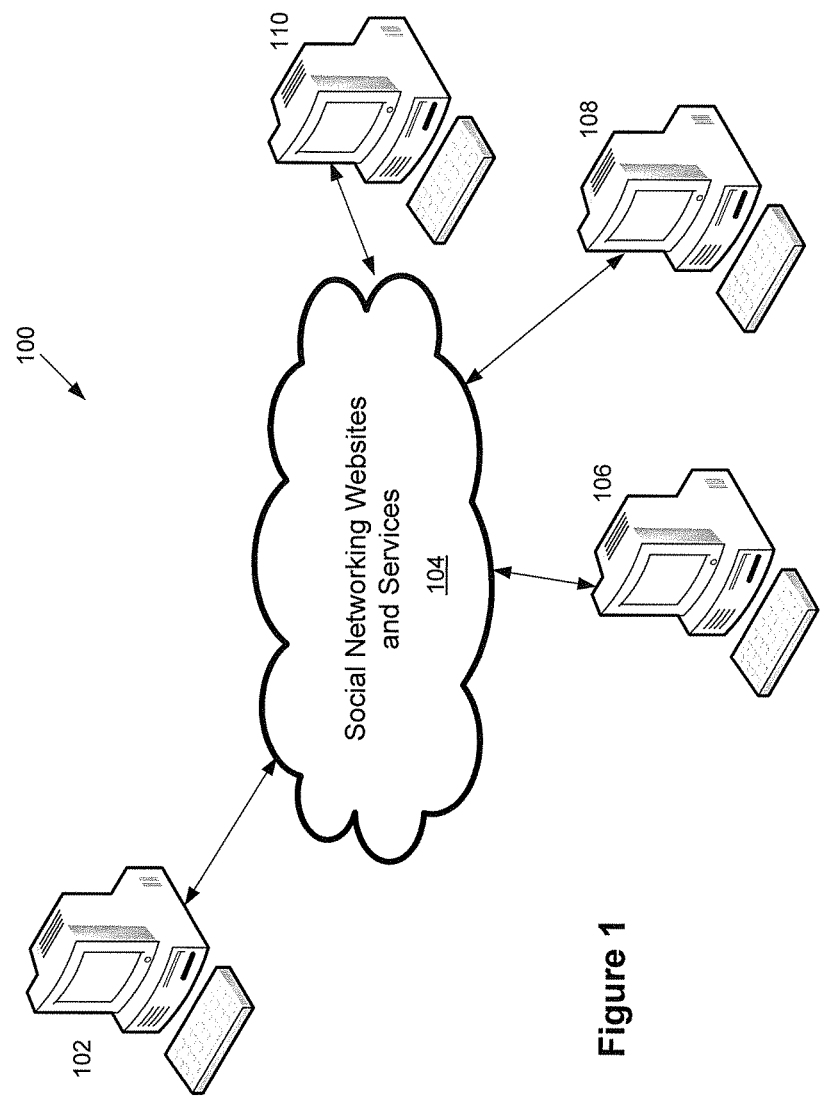
FIG. 1 is a block diagram that illustrates a first example of a social networking environment for one or more social networking websites in accordance with embodiments of the disclosed technology.

Embodiments of the disclosed technology include new and unique approaches that provide end users with the ability to manage and control their various social networking website accounts and content using a simple local file system metaphor. Consider an example in which an end user desires to share his or her photos using social networking websites such as www.Facebook.com or www.Flickr.com. While such social networking websites may provide interfaces for uploading and sharing images that are interesting and powerful, the interface also tend to be independent and isolated. These tools are often cumbersome and not prone to automation. For example, an end user would typically need to use interface tools specific to each social networking website to identify and upload images.

Embodiments of the disclosed technology may allow an end user to simply copy to a certain local directory images or other files that the end user wishes to make available to his or her social networking websites. Authentication, upload, synchronization, update, and/or deletion of such files would be automatically performed for one or more of the end user's websites. For example, in order for an end user to manage all of his or her photos in his or her Facebook album(s), the end user could simply move files into and out of certain directories on a local file system or other system that appears to be a local file system.

Once an end user has moved one or more images or other files into or out of certain directories, the system may automatically synchronize the user's shared images or other files to his or her Facebook account. Consequently, the user may effectively collaborate with others that are using the same social networking system without needing to actually use the system. Also, there is no need for the shared images or other files to be actually copied to or stored at social networking site servers. Accordingly, the user maintains significantly greater control over the shared content than he or she would have if the content were stored elsewhere.

In certain embodiments, the system may use actual local storage for storing the pertinent files. Alternatively, the system may use intermediate shared cloud storage, i.e., remote storage with a merge view as if it were local, to store the pertinent files. In other embodiments, the system may implement both actual local storage and intermediate shared cloud storage for storing pertinent files. Regardless of where the user's content is actually stored, the system may effectively provide the user with a single, local file system consisting of a merged view of both cloud storage and local storage. The end user does not need to know or manually detect which data is stored locally and which data is stored at a remote location.

In certain embodiments, an end user may manage certain content, such images or other files, on a particular social networking site by using a shared folder on an electronic device, such as a desktop or laptop computer, PDA, smartphone, etc., to store the content. By moving the file(s) to the shared folder, the user is indicating to the system that he or she would like the file(s) to be made available to the particular social networking site. The shared folder can be optionally synchronized to a cloud storage provider.

Consider an example in which an end user, from his or her Windows desktop, creates a new folder called "FamilyVacation2011" under the c:\facebook\photos\directory, i.e., c:\facebook\photos\FamilyVacation2011. In certain embodiments, this action is identified by a dynamic storage technology (DST) driver that is specifically designed to interface with the Facebook website and, more particularly, with the user's own Facebook account. For example, the DST driver may be configured to monitor for changes to the c:\facebook\directory and sub-directories either continuously, at certain times, or when certain conditions are met.

In the example, the DST driver would recognize that that there is a new directory called "FamilyVacation2011" under the c:\facebook\photos directory and, consequently, create or cause to be created a new album in the user's Facebook account. The directory created in the user's Facebook account may have the same name or a different name.

Each time the user drops photos or other files into what the user may perceive to be a "local directory," those photos or files may be automatically synchronized with the user's Facebook account and, consequently, appear in the newly created album. This allows friends, family members, and others to access, e.g., view those photos or other files. Each time the user deletes one or more of the photos or files by deleting them from the "local directory" view of the user's photo album or other folder or directory, the photos or files may be automatically removed from the user's Facebook album. If a certain photo or file has already been removed from the shared area used by the photo sharing application in Facebook, it is no longer available to be shared so the shared experience is affected immediately with no need to find a copy of the photo or file to delete.

Policies may direct or provide certain control over content to be posted to a social networking website. Consider an example in which a user has generated a local policy, e.g., independent from any policy of the user's social networking websites, to prevent the posting of images of his or her children to any or all of his or her social networking websites. If the user accidentally copies some images into the c:\facebook\photos\FamilyVacation2011 directory that include images of his or her children, the DST driver would consult the local policy and, consequently, would not allow the synchronization of those files to the user's social networking websites.

In situations where a user logs into his or her Facebook account and manages his or her content directly using the Facebook interface, the system may synchronize the changes back to the "local drive interface" such that the user would see the changes at both ends. In other words, a user is not limited to using a single interface when updating his or her social networking content.

Detailed Examples of Social Networking Environments in Accordance with the Disclosed Technology FIG. 1 is a block diagram that illustrates a first example of a social networking environment 100 for one or more social networking websites in accordance with embodiments of the disclosed technology. An end user may user a computer 102 to interact with one or more social networking websites 104, such as www.Facebook.com or www.LinkedIn.com. The end user may use the computer 102 to manage content, such as images, videos, text, or text-based files, that the user wishes to make available to one or more of the social networking website(s) 104. Other users may use their own computers 106-110 to access the content uploaded by the end user to the social networking website(s) 104.

While the electronic devices in the illustrated example are personal computers, one having ordinary skill in the art will recognize that other devices such as laptop computers, handheld computers, personal digital assistants (PDAs), and smartphones may be used by an end user or other user in addition to or in place of a personal computer.

Figure 2:
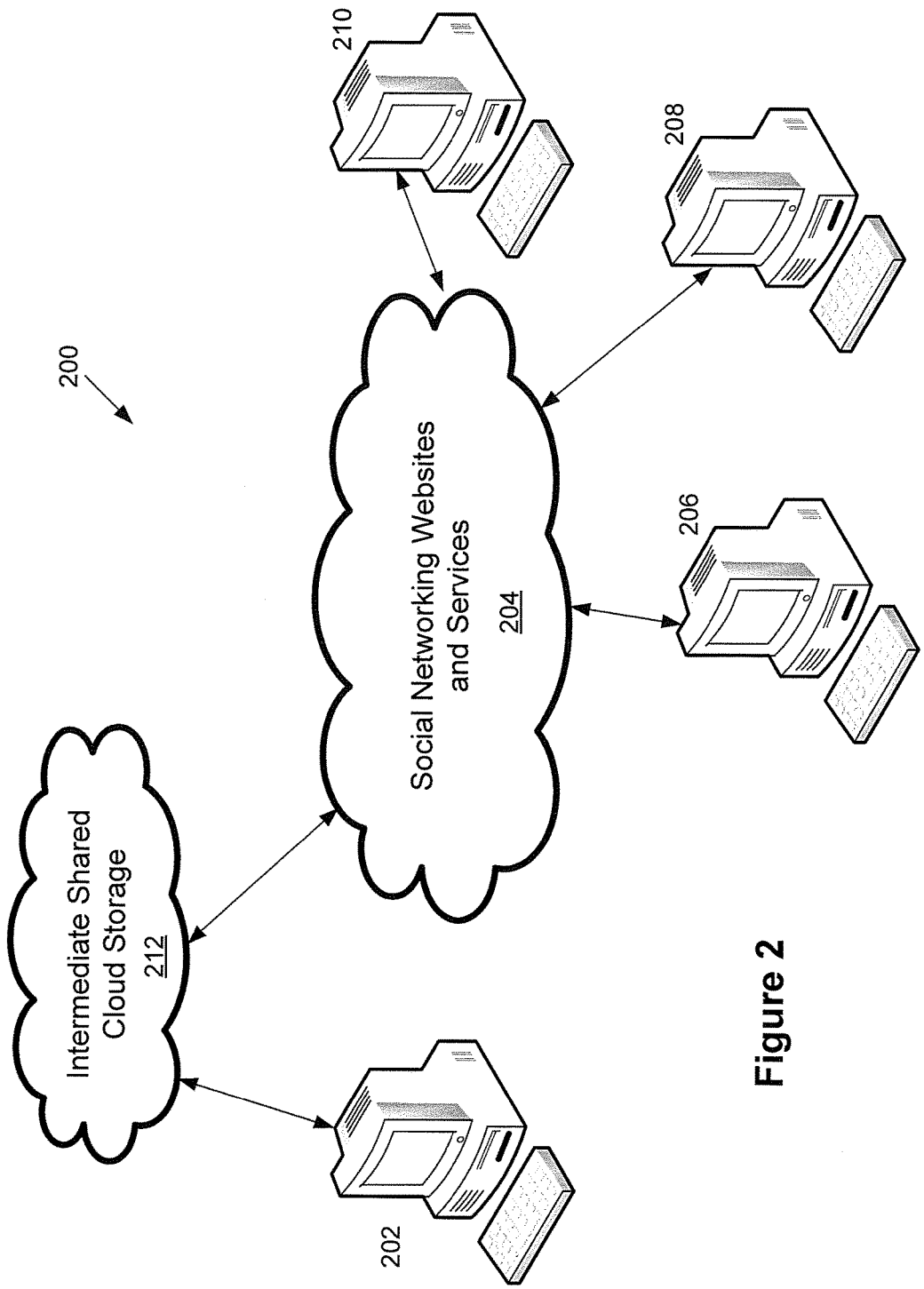
FIG. 2 is a block diagram that illustrates a second example of a social networking environment for one or more social networking websites in accordance with embodiments of the disclosed technology.

FIG. 2 is a block diagram that illustrates a second example of a social networking environment 200 for one or more social networking websites in accordance with embodiments of the disclosed technology. The social networking system 200 is similar to the social networking system 100 of FIG. 1 in that an end user may use a local device 202 to make content available to one or more social networking websites 204 that may be accessed by other users using their own electronic devices 206-210. In the social networking system 200 of FIG. 2, however, intermediate shared cloud storage 212, also referred to as a cloud storage provider, may be used to store some or all of the content managed by the end user.

An end user may wish to publish folders and files to the intermediate shared cloud storage 212 to save the local device 202 from being required to have sufficient storage to hold all of the user's social networking content. For example, if the local device 202 has enough local storage, the corresponding DST driver for each of the user's social networking websites could run off of the local device 202 directly. If the local device 202 does not have enough local storage, however, the intermediate shared cloud storage 212 may be used to give the perception of a large local disk to the local device 202. This may be the case where the local device 202 is a PDA or smartphone that has significantly less storage capacity than a desktop or laptop computer, for example.

Figure 3:
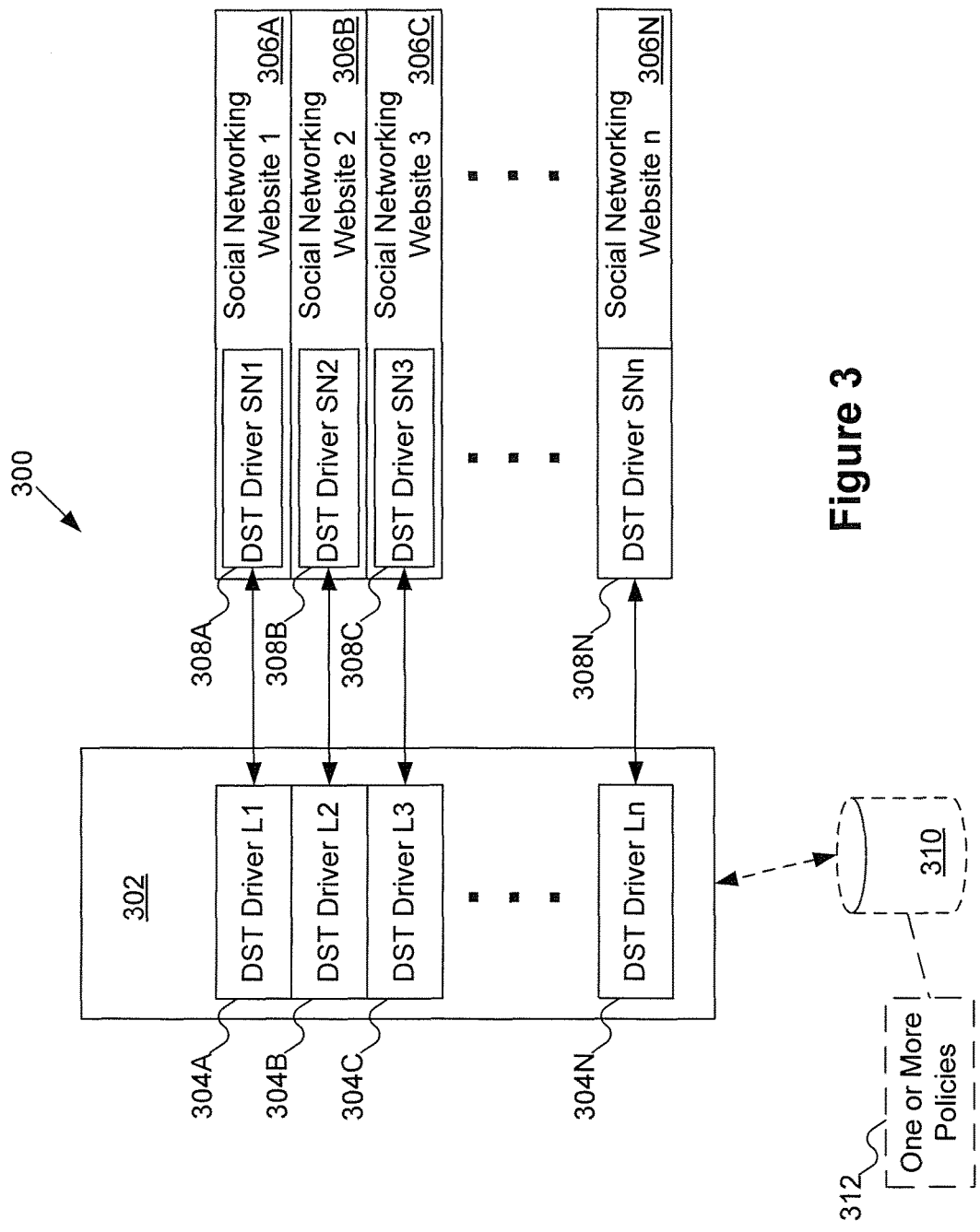
FIG. 3 is a block diagram that illustrates a first example of a social networking content management system in accordance with embodiments of the disclosed technology.

Detailed Examples of Social Networking Content Management Systems in Accordance with the Disclosed Technology FIG. 3 is a block diagram that illustrates a first example of a social networking content management system 300 in accordance with embodiments of the disclosed technology. In the example, the system 300 includes a local electronic device 302 such as a desktop or laptop computer, PDA, smartphone, etc. The local device 302 has n local DST drivers 304A-304N, each of which is configured to interact with at least one of a number of social networking websites or services 306A-306N. Each of the social networking websites or services 306A-306N has a corresponding DST driver 308A-308N, respectively, that is configured to interact with the local device 302.

In certain embodiments, which will be referred to herein as "push model" embodiments, the local DST drivers 304A-304N may be implemented as DST agents that provide a merged view of data stored at the corresponding social networking websites or services 306A-306N, respectively, as if the data was locally stored, i.e., at the local device 302. Every time a user places an image or other file into a designated shared directory on the local device 302, for example, one or more of the local DST drivers 304A-304N may "push" the image or other file to the corresponding social networking website or service 306A-306N, respectively. Each of the social networking websites or services 306A-306N may subsequently make the image or other file accessible to other users.

In other embodiments, which will be referred to herein as "pull model" embodiments, the social networking-side DST drivers 308A-308N may be implemented as applications that are each specifically configured to interact with a corresponding social networking website or service 306A-306N, respectively. Every time a user places an image or other file into a designated shared directory on the local device 302, for example, one or more of the social networking-side DST drivers 308A-308N may "pull" the image or other file into the corresponding social networking website or service 306A-306N, respectively. The social networking websites or services 306A-306N may then make the image or other file accessible to other users.

Certain implementations of the disclosed technology may include a combination of "pull model" and "push model" implementations. For example, the local device 302 may interact with the second social networking website 306B by way of the second social networking-side DST driver 308B and interact with the first and third social networking websites 306A and 306C by way of the first and third local DST drivers 304A and 304C, respectively. One having ordinary skill in the art will recognize that there may be any of a number of permutations.

In certain embodiments, the system 300 also includes a policy database 310 configured to store any of a number of policies 312 that may be relied on by any of the local DST drivers 304A-304N or social networking-side DST drivers 308A-308N. The policies 312 may include any combination of local policies or social networking website-specific policies. Examples of the policies 312 are described below.

Figure 4:
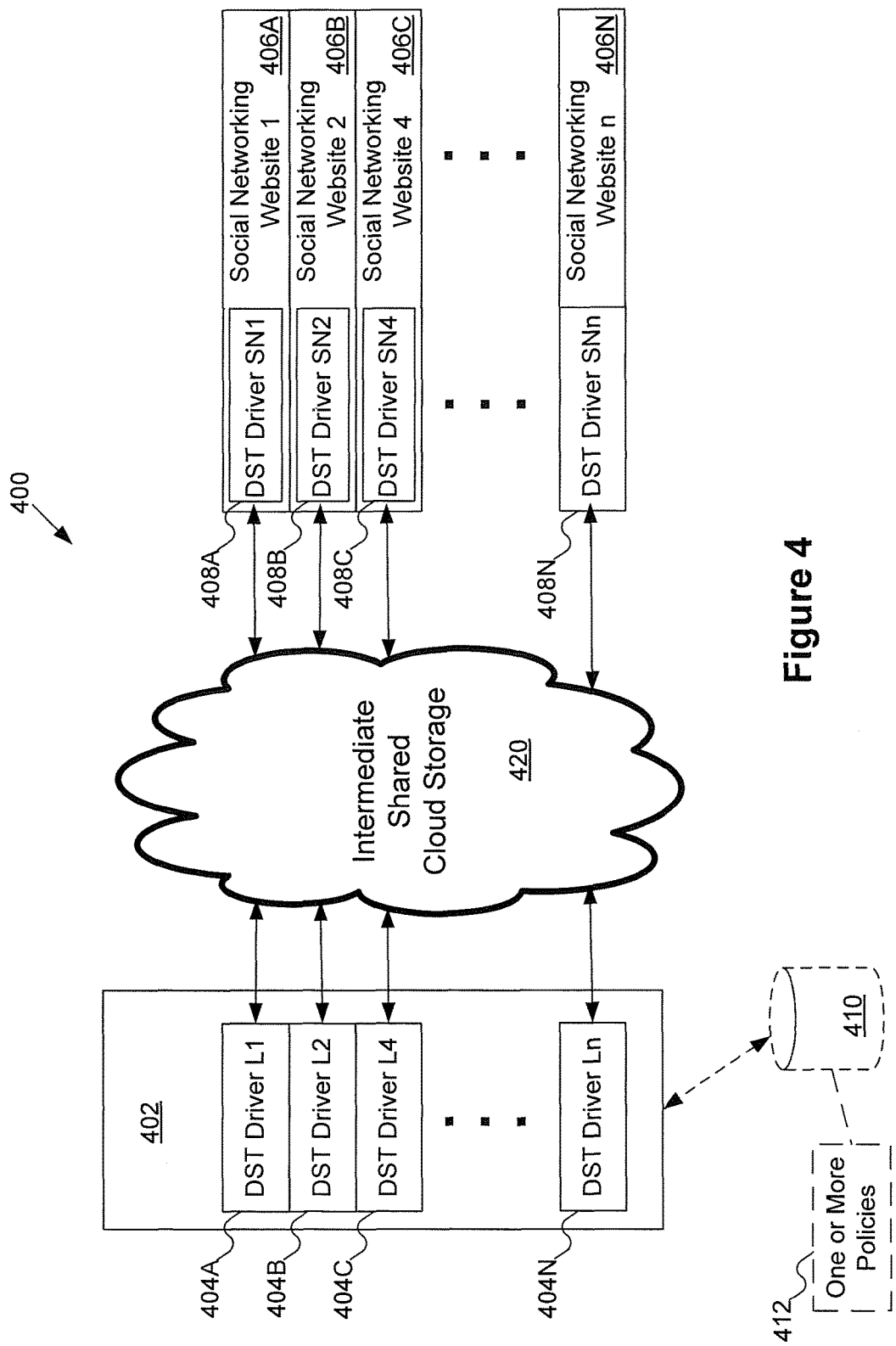
FIG. 4 is a block diagram that illustrates a second example of a social networking content management system in accordance with embodiments of the disclosed technology.

FIG. 4 is a block diagram that illustrates a second example of a social networking content management system 400 in accordance with embodiments of the disclosed technology. The system 400 is similar to the system 300 of FIG. 3 in that it includes a local electronic device 402 that has n local DST drivers 404A-404N, each of which is configured to interact with at least one of a number of social networking websites or services 406A-406N, respectively. Also, each of the social networking websites or services 406A-406N has a corresponding DST driver 408A-408N, respectively, that is configured to interact with the local device 402. The system 400 may include a policy database 410 for storing one or more polices 412.

The system 400 of FIG. 4, however, includes an intermediate shared cloud storage 420, also referred to as a cloud storage provider, which may be used to store some or all of the content managed by the end user. For example, content that is designated to be shared with the user's social networking websites is not moved to the corresponding social networking website servers; rather, the content to be shared is stored in the intermediate shared cloud storage 420, from which each of the social networking websites or services 406A-406N may access the content.

Figure 5:
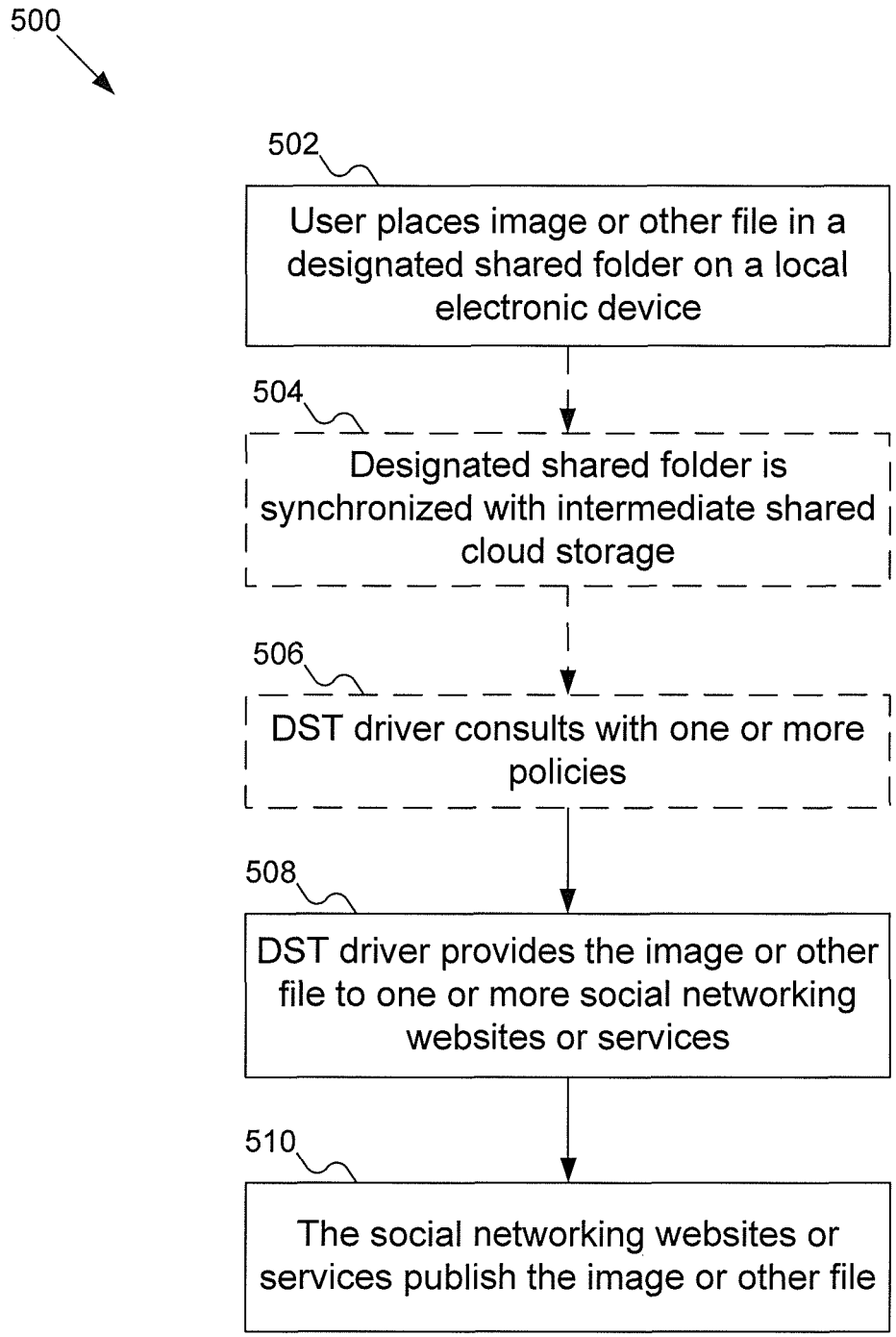
FIG. 5 is a flowchart that illustrates a first example of a machine-controlled method of managing content for social networking websites and services in accordance with embodiments of the disclosed technology.

Detailed Examples of Machine-Controlled Methods of Managing Content for Social Networking Websites and Services in Accordance with the Disclosed Technology FIG. 5 is a flowchart that illustrates a first example of a machine-controlled method 500 of managing content for social networking websites and services in accordance with embodiments of the disclosed technology. At 502, a user places an image or other file in a designated shared folder on a local electronic device, such as a computer, PDA, or smartphone. This may be performed by way of a drag-and-drop, copy-and-paste, cut-and-paste, or other suitable action. In certain embodiments, the user may simultaneously place any number of images and/or other files in the designated shared folder.

In certain embodiments, each file that is placed in the designated shared folder is augmented with one or more markers such as an internal attribute, an external filesystem extended attribute, a header, a comment, or a tag. Consider an example in which there is a directory called c:\data\corporate_restricted. In the example, each file that is placed in the directory would be augmented with two attributes: "Company=XYZ" and "RestrictedContent=yes." A DST driver may consult one or more policies that rely on these attributes as described below.

At 504, the designated shared folder is optionally synchronized with an intermediate shared cloud storage. For example, the image or other file placed in the designated shared folder may be copied to the intermediate shared cloud storage. In certain embodiments, the image or other file placed in the designated shared folder may be deleted from the designated shared folder once it has been successfully copied to the intermediate shared cloud storage. Such action may be based at least in part on a user-defined policy, for example.

At 508, the image or other file is provided to one or more social networking websites or services. For example, one or more DST drivers may interact with one or more social networking website interfaces. In certain implementations, one or more DST drivers may be associated with the shared storage side and "push" the data to the social networking website or service using interfaces defined by the specific website or service, such as the local DST drivers 304A-304N illustrated in FIG. 3. Alternatively or in addition thereto, one or more DST drivers may be written as an application or agent that is unique to the social networking website or service that "pulls" the data into the social networking website or service, such as the social networking-side DST drivers 308A-308N illustrated in FIG. 3.

In certain embodiments, one or more DST drivers may be policy-controlled in that they perform certain actions with respect to images and other files in a shared directory based at least in part on one or more policies. In these embodiments, a DST driver may consult a policy before providing an image or other file to a social networking website or service, as shown at 506. A policy may be user-defined, driven by a particular social networking website or service requirements, or some combination thereof. DST drivers may be configured to monitor, continuously or at certain times, for new content in a shared area that may need to be synchronized with one or more social networking websites or services and vice versa.

Social networking websites often have their own policies that control what type of content may be allowed on the site. For example, some social networking websites might not allow nudity or obscenity while others may encourage such content. In certain embodiments, a user may create a local policy that is independent of, e.g., more restrictive or permissive than, a particular social networking website policy. For example, a local policy may indicate that certain types of content are not to be allowed on one or more social networking websites even though such content may be considered allowable by the website policies. In certain embodiments, a user may "train" a local policy by way sample images or files. The local policy may be tied to metadata such as name, date, and/or file type, e.g., no mp3 files are allowed, or to relevancy, e.g., no files that are like a certain picture or "corporate secret" file are allowed.

Certain policies may focus on attributes with which files may be augmented. For example, if a policy indicates that files having certain attributes should not be published to a social networking website, a DST driver will not allow the file to be published to the social networking website pursuant to the policy if the file has those attributes. Consider the example described above concerning the directory c:\data\corporate_restricted. If a file is placed in the directory, it will be augmented with the two attributes described above ("Company=XYZ" and "RestrictedContent=yes"). In the example, a policy provides that any file from company XYZ that has restricted content should not be published to any social networking website. Accordingly, the DST driver will not allow any file placed in this directory to be published to any social networking website.

In certain embodiments, a policy may further indicate that files having certain attributes are to be archived. For example, a policy may indicate that any file having attributes indicating that the file is from company XYZ and that the file has restricted content is to be sent to a secure archive. The secure archive may include a local archive or a remote archive. Accordingly, a DST driver may prevent such files from being published on a social networking website and also send the files to the secure archive.

At 510, the one or more social networking websites or services each publish the image or other file. As used herein, publishing an image or other file means making the image or other file available to users including, but not limited to, the end user providing the image or other file as well as any friends, family, colleagues, etc. that the end user has indicated, directly or indirectly, may be allowed to access, e.g., view, the image or other file. For example, a social networking website or service may allow a user to view the image whenever a user visits or otherwise accesses the directory in which the image is perceived to be stored.

Figure 6:
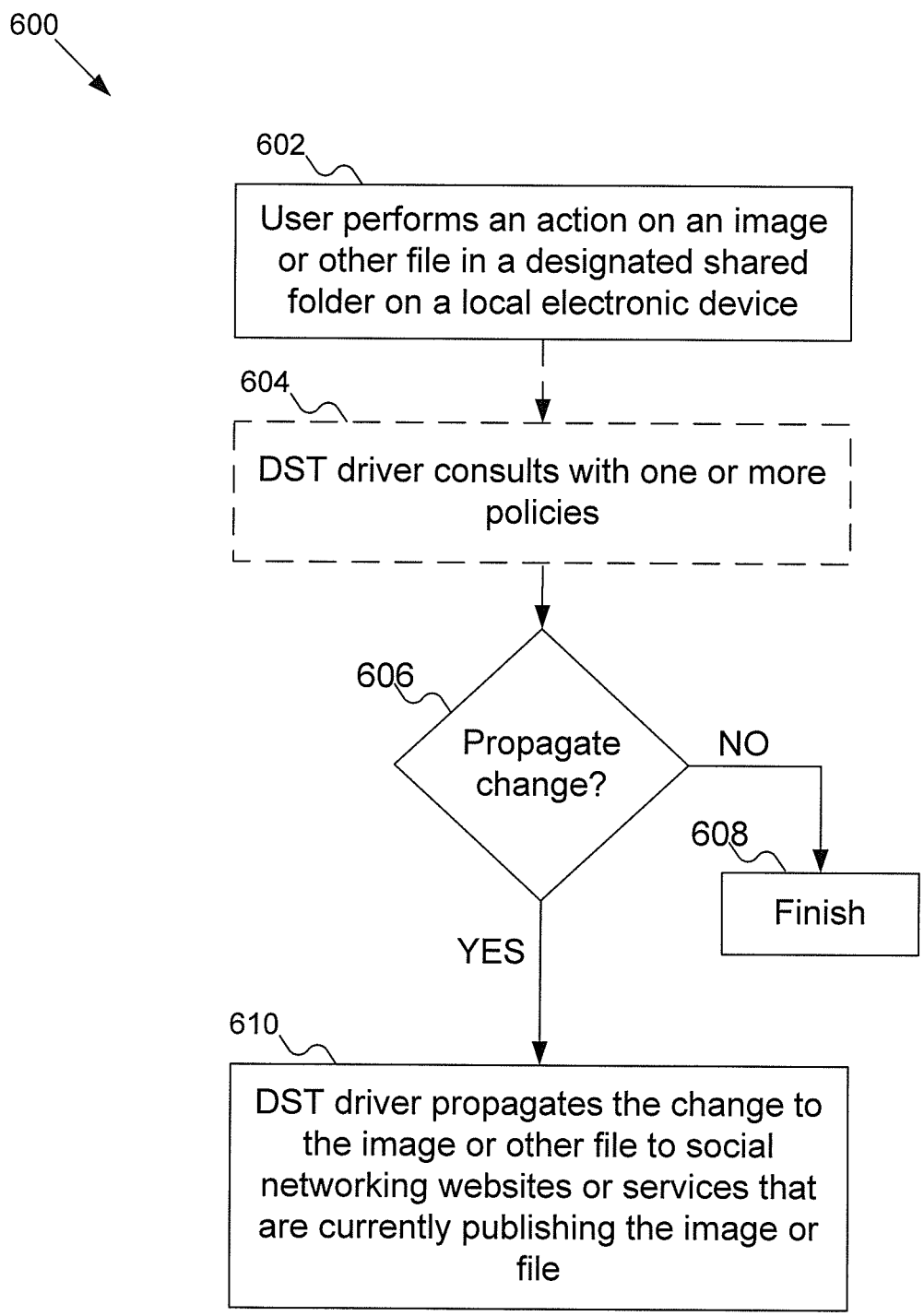
FIG. 6 is a flowchart that illustrates a second example of a machine-controlled method of managing content for social networking websites and services in accordance with embodiments of the disclosed technology.

FIG. 6 is a flowchart that illustrates a second example of a machine-controlled method 600 of managing content for social networking websites and services in accordance with embodiments of the disclosed technology. At 602, a user performs an action on an image or other folder that is currently available to one or more of the user's social networking websites or services. For example, the user may edit, delete, move, or rename the image or other file. At 604, a DST driver may optionally consult one or more policies before taking any action with respect to the image or other file on which the user performed in action at 602. The DST driver may be either a local DST driver or agent or a social networking-side DST driver.

At 606, the DST driver determines whether the change is to be propagated to the social networking websites or services that are currently publishing the affected image or other file, if any. If there is no need to propagate the change, e.g., the file is simply renamed, or if a policy provides that the change is not to be propagated, processing stops, as shown at 608; otherwise, the DST driver propagates the change to the image or other file to any social networking websites or services that are currently publishing the image or other file, as shown at 610. For example, if the user deleted the image at 602, the social networking websites or services would no longer have access to the image and would, as a result, effectively cease publishing of the image immediately. In certain situations, the propagated change may be transparent to other users that subsequently access the affected file.

Certain implementations of the disclosed technology include the use of sharing restrictions and access control. For example, a user may want some of his or her friends or colleagues to see or access some of the user's data but not other data that the user wishes to reserve for a different set of friends or colleagues. Such access control across multiple social networking websites and services may be realized in a number of ways. For example, the user could maintain a certain XML file or other syntax file in a designated folder, e.g., c:\Facebook\photos\AccessControl, that represents the user's desired Facebook settings. The file could be edited manually or with a tool and, each time the file is edited, it may be synchronized, e.g., using a Facebook-specific DST driver, to the user's Facebook account.

In other embodiments, there could be extended attributes on each file in the designated shared directory that indicates the desired access control to be used by Facebook. The user can use the standard tools associated with the file system to manage those attributes so that the Facebook-specific DST driver performs the specific actions directed by the user. Alternatively or in addition, there could be a policy associated with the particular DST driver so that the driver performs the user-desired actions by default.

Certain implementations support a many-to-many mapping between content and social networking sites. Consider an example in which a user has social networking sites $S_1$ through $S_N$ and multiple personal profiles $P_1$ through $P_M$.

This may be pertinent in situations where a user wants to reveal his or her current employer when collaborating with colleagues about his or her current job but not reveal the current employer if he or she is looking for a job, for example. If the user moves or changes jobs, the user can change the data one time and have it be synchronized to multiple social networking site protocols without any need for the user to log into each of his or her social networking sites and change the personal profile. The user may accomplish this by way of a policy such as those described above. Table 1 provides an example of such a user-defined policy:

TABLE 1

| Profile | Social Networking Site |
|---------|------------------------|
| $P_1$ | $S_1, S_3, S_4$ |
| $P_2$ | $S_2, S_6$ |
| $P_3$ | $S_8$ |
| $P_4$ | $S_5, S_7, S_9$ |

If the user changes his or her information in profile $P_1$, the system by way of a DST driver, for example, would propagate the change to social networking sites $S_1$, $S_3$, and $S_4$ based on the policy.

Detailed Examples of Specific Implementations in Accordance with the Disclosed Technology Consider an example in which an end user copies an image, such as a photograph, named "image_1.jpg" to the following directory on his or her local device: c:\Facebook\photoaamilyVacation2010. A DST driver on the user's local device may subsequently and automatically provide the image to the following location: https://s3.amazonaws.com/fbalbums/FV2010. The DST driver may consult one or more policies before providing the image.

In the example, there is a new Facebook application that is configured to share photos in https://s3.amazonaws.com/fbalbums/FV2010. Accordingly, the Facebook application can recognize that there is a new image, i.e., "image_1.jpg," to be displayed in an album on the user's Facebook account that corresponds to the "FamilyVacation2010" album that is stored on the user's local device. Another user, such as a friend or family member that has access to the user's Facebook account, may now view the "image_1.jpg" image in the user's "Family Vacation 2010" album.

If the user decides that there is something embarrassing in the "image_1.jpg" image, or simply desires to remove it for some other reason, the user may effectively remove the image from his or her Facebook account by way of a simple delete using a local electronic device, e.g., by executing a "delete" function on the file in Windows Explorer. A DST driver will them remove the image from https://s3.amazonaws.com/fbalbums/FV2010. As a result, the image is no longer accessible by the user's Facebook album. The user did not need to log into his or her Facebook account and delete the image manually from there.

Consider a situation in which a user moves and thus has a new address. The user may update a single file, such as a text file, spreadsheet, template, XML file, or HTML file. In this example, the system will detect the change to the file and can be configured to automatically update any or all of the user's Facebook, Google Groups, or LinkedIn accounts with the user's new location information, for example.

Consider another situation in which the user switches jobs. The user can edit a single file on the local file system or interact with a local service interface. In this example, the system will detect the change and can be configured to automatically update the user's career history information on his or her LinkedIn and Plaxo accounts, for example. The user can also provide a policy that directs the system to not update the user's resume at www.monster.com, for example, or any other site the user may continue to use for possibly even better future employment opportunities.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A machine-controlled method implemented as executable instructions within a non-transitory computer-readable storage medium for execution on a machine, the machine executing the instructions to perform the method comprising, comprising:

receiving, by the machine, at least one file in a designated shared folder on the machine and the folder part of a file system of the machine and the machine is a local device operated by a particular user;

automatically providing access by a driver, executing on the local device, to the at least one file in the designated shared folder to a social networking website, the driver monitoring the designated shared folder on the machine and interfaces with the social networking website on behalf of the particular user using an account of the particular user at the social networking website, the driver interfacing with the social networking website using a social network interface of the social network website;

automatically authenticating, synchronizing, uploading, updating, and deleting, by the driver particular files based on detecting the placing and removing of those particular files into and out of the shared folder as made by the particular user operating the machine using the file system of the machine and other files residing on the machine and the file system that are not in the shared folder are not processed in any manner;

preventing, by the driver, a designated file placed in the shared folder by the particular user from being shared with the social networking site based on content of the designated file and a user-defined policy that is independent of any social networking website policy;

allowing by the driver using the social network interface, the social networking website to make the at least one file available to users that are allowed to access the particular user account at the social networking website;

synchronizing by the driver using the social network interface, settings included in a certain file in the designated shared folder with other settings maintained on the social networking website, each time the certain file is edited, the certain file is synchronized with the other settings;

detecting by the driver changes to content within the account of the social networking website that are made by the user on the social networking website through the social network interface and synchronizing those changes to the content back in the designated shared folder on the machine; and maintaining by the driver a plurality of user-defined profiles, each profile associated with a subset of social networking websites of the user and at least one subset associated with the social networking website, and synchronizing by the driver changes made by the user to a particular profile with social networking profiles maintained by corresponding ones the social networking websites that are associated with the changed particular profile.

2. The machine-controlled method of claim 1, wherein the at least one file in the designated shared folder comprises an image file.

3. The machine-controlled method of claim 1, wherein the driver comprises a dynamic storage technology (DST) driver.

4. The machine-controlled method of claim 1, further comprising synchronizing the designated shared folder with an intermediate shared cloud storage.

5. The machine-controlled method of claim 4, wherein synchronizing the designated shared folder with an intermediate shared cloud storage comprises copying the at least one file to the intermediate shared cloud storage.

6. The machine-controlled method of claim 5, further comprising deleting the at least one file in the designated shared folder subsequent to the copying.

7. The machine-controlled method of claim 1, further comprising the driver consulting a policy prior to providing the access to the at least one file in the designated shared folder to the social networking website.

8. The machine-controlled method of claim 7, wherein the access provided by the driver is based at least in part on the policy consulted by the driver.

9. The machine-controlled method of claim 7, wherein the policy is defined by a user of the particular user account at the social networking website.

10. The machine-controlled method of claim 1, wherein the local device comprises one of a desktop computer, a laptop computer, a personal digital assistant (PDA), and a smartphone.

11. The machine-controlled method of claim 1, further comprising providing a user with a view of a plurality of files comprising the at least one file in the designated shared folder and at least a second file stored at a remote location.

* * * * *